United States Patent [19]
Lin

[11] Patent Number: 5,596,278
[45] Date of Patent: Jan. 21, 1997

[54] CONDITION TESTER FOR A BATTERY

[75] Inventor: Lifun Lin, Lincoln, Mass.

[73] Assignee: Duracell Inc., Bethel, Conn.

[21] Appl. No.: 524,960

[22] Filed: Sep. 8, 1995

[51] Int. Cl.⁶ .................... G01N 27/416; H01M 10/48
[52] U.S. Cl. .................... 324/435; 340/636; 429/91
[58] Field of Search ................. 324/435, 94; 429/91, 429/92, 93; 340/636

[56] References Cited

U.S. PATENT DOCUMENTS

| | | | |
|---|---|---|---|
| 3,634,834 | 1/1972 | Bisset | 324/94 |
| 4,723,656 | 2/1988 | Kiernan et al. | 429/93 |
| 5,223,003 | 6/1993 | Tucholski | 429/93 |
| 5,231,356 | 7/1993 | Parker | 324/435 |
| 5,250,905 | 10/1993 | Kuo et al. | 324/435 |
| 5,339,024 | 8/1994 | Kuo et al. | 324/435 |
| 5,355,089 | 10/1994 | Treger | 324/435 |
| 5,396,177 | 3/1995 | Kuo et al. | 324/435 |
| 5,409,788 | 4/1995 | Weiss et al. | 324/345 |
| 5,416,406 | 5/1995 | Jette | 324/94 |
| 5,418,085 | 5/1995 | Huhndorff et al. | 429/91 |
| 5,418,086 | 5/1995 | Bailey | 429/93 |
| 5,458,992 | 10/1995 | Bailey | 324/435 |

*Primary Examiner*—Maura K. Regan
*Attorney, Agent, or Firm*—Robert J. Feltovic; Rose M. Allen; Barry D. Josephs

[57] ABSTRACT

A condition indicator assembly (tester) for determining the condition of a main cell, e.g. a battery, is disclosed. The condition indicator assembly may comprise an electrochemical indicator cell connected in series to a auxiliary cell. The indicator cell and auxiliary cell each have an anode, cathode and electromotive force (e.m.f.) of its own. The condition indicator assembly may be permanently connected in parallel to the terminals of a main cell being tested. The condition indicator assembly is thin enough that it may be iterated into a label for the main cell. As the main cell discharges, the indicator cell anode clears proportionally to the discharge of one of the electrodes of the main cell to provide a continuous visually discernible indication of the state of charge of the main cell.

15 Claims, 3 Drawing Sheets

5,596,278

CONDITION TESTER FOR A BATTERY

This invention relates to a condition tester for determining the condition of a battery or main cell and integrally relating the tester thereto. The invention relates to electrochemical state of charge testers.

Electrical primary cells which include various devices for visually indicating the condition or state of charge of the cell have been disclosed. The known indication devices include, but are not limited to, chemical indicators which react with materials inside the battery, chemical indicators located externally to the battery, elements embedded within an electrode that become visible during discharge, and thermochromic materials in thermal contact with a resistive element that is adapted to be connected across the battery. A problem with many of these indicators is the timing of their indication is sensitive to the construction geometry of the indicator on or within the battery. Therefore, natural variations which inherently occur during manufacture lead to variability, from battery to battery, in the time during discharge when the indication occurs.

Commercially available testers to determine the condition of an electrochemical cell are typically of the thin film heat responsive type. This type of tester contains a thermochromic material in thermal contact with an electrically conductive element. Such testers are commercially available in the form of strips which are not integrated into the cell or cell label. To use the tester one must apply it to the terminal ends of the cell being tested. Examples of such testers and their application are disclosed in U.S. Pat. Nos. 4,723,656 and 5,188,231. These testers work well for intermittent testing of a battery during its useful life. They are more difficult to permanently attach to a battery because the visual indicator is a thermochromic material. Care must be taken to thermally insulate the indicator from the battery casing in order to prevent heat transfer that would interfere with proper operation of the indicator. Additionally, the electrically conductive element is connected in series with, and drains the battery during the test. Therefore, the electrical contacts of the tester cannot be permanently attached to the battery terminals in the absence of an activatable contacting device, otherwise, the battery would be prematurely discharged through the tester.

Another type of battery tester is an electrochemical tester which has an electromotive force (e.m.f.) of its own as disclosed in U.S. Pat. No. 5,250,905 and U.S. Pat. No. 5,396,177. The indicator cell is designed to have about the same open circuit voltage (OCV) as the main cell during discharge. In such case the indicator cell may be connected directly in parallel to the main cell. Such tester has the advantage that it may be permanently attached to the battery being tested and does not require activatable contacting devices. This type of tester provides visual indication of the battery's extent of discharge by the extent to which a thin film of metal is electrochemically stripped or cleared to reveal a background of different color.

Coulometric devices can keep track of the coulombs of electrical charge that pass through electronic equipment with which they may be associated. Examples of coulometric devices which use the electrochemically induced change in length of a column of mercury to give visual indication of the quantity of charge passed are disclosed in U.S. Pat. Nos. 3,045,178 and 3,343,083. Coulometric devices do not have an electromotive force of their own and are in effect electrolytic cells.

The invention will be better understood with reference to the drawings in which.

For the purposes of the following discussing the electrochemical cell or battery that is being measured will be referred to as the "main cell" and the electrochemical cell that generates the display will be called the "indicator cell".

The invention is directed to a condition indicator assembly (tester) which is electrically connected to and visually displays the condition of a main cell or battery. The condition indicator comprises an indicator cell which is a thin-film electrochemical cell comprising an anode, a cathode, and an electrolyte contacting at least a portion of both said anode and cathode. The indicator cell has an anode and cathode of different material and a finite electromotive force (e.m.f.), typically, greater than 100 millivolts, e.g., between about 100 millivolts and 1.5 volts. It has been determined in the present invention that the indicator cell may be designed to have an open circuit voltage which is either higher or lower than that of the main cell being tested, if an auxiliary cell having a finite electromotive force (e.m.f.) is connected in series with the indicator cell to compensate for the difference in open circuit voltage between indicator cell and main cell. That is, one of the anode and cathode of the auxiliary cell is electrically connected to one of the anode and cathode of the indicator cell. The remaining electrode of the auxiliary cell and the remaining electrode of the indicator cell are electrically connected in parallel to the main cell terminals. During discharge of the main cell, reaction begins in the visible electrode of the indicator cell and continues to remote regions thereof. During discharge of the main cell being tested the open circuit voltage of the condition indicator comprising the indicator cell and the auxiliary cell is similar to the open circuit voltage of the main cell, preferably within (plus or minus) about 300 millivolts of the open circuit voltage of the main cell.

Figure 1:
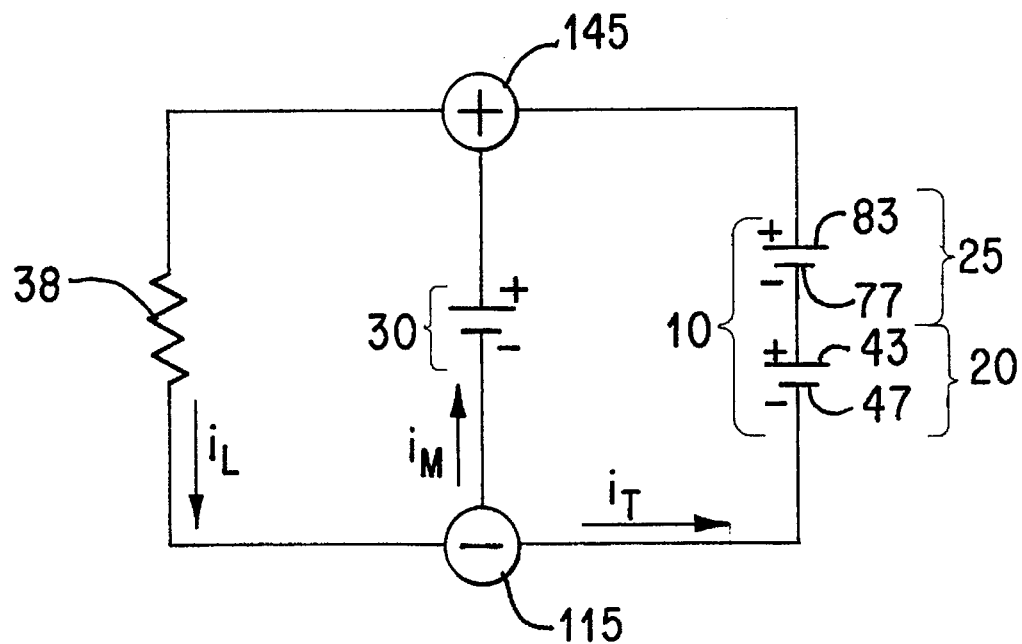
FIG. 1 is a circuit diagram showing the connection of the condition indicator (tester assembly) of the invention to the main cell being tested with the voltage of the indicator cell portion lower than the voltage of the main cell.

In the circuit arrangement, depicted in FIG. 1, the condition indicator 10 comprises an indicator cell 20 and an auxiliary cell 25. The indicator cell 20 and the auxiliary cell 25 are electrochemical cells having a finite electromotive force (e.m.f.) of their own. In the circuit arrangement depicted in FIG. 1 the open circuit voltage (OCV) of the indicator cell 20 is lower than the open circuit voltage of main cell 30. In this case the auxiliary cell anode 77 is electrically connected to the indicator cell cathode 43, the auxiliary cell cathode 83 is connected to the main cell cathode 145, and the indicator cell anode 47 is connected to the main cell anode 115. (The anode of either the auxiliary cell 25 or indicator cell 20 is defined as the electrode being oxidized and thus releasing electrons. It should also be understood that there are internal resistances associated with each of the main cell 30, the indicator cell 20, and the auxiliary cell 25.) In the circuit arrangement of FIG. 1, the open circuit voltage of the indicator cell 20 becomes added to the open circuit voltage of the auxiliary cell 25 so that the combined open circuit voltage of the condition indicator 10 as a whole, i.e., between cathode 83 of the auxiliary cell 25 and anode 47 of the condition indicator cell 20 is about the same as the open circuit voltage of the main cell 30. The capacity of the indicator cell 20 is much less than the capacity of the main cell 30 and the combined internal resistance of the indicator cell 20 and auxiliary cell 25 is much greater than that of main cell 30. The much higher resistance of the condition indicator assembly 10 allows indicator cell 20 to discharge at a much lower rate than the main cell. This is required, since the indicator cell 20 has a much smaller capacity compared to the main cell. During discharge of the main cell 30, the ratio of the current, $i_M$, through the main cell to the current, $i_T$, through the indicator cell may be a constant so that the percent depletion of one of the anode or cathode of the auxiliary cell will be about the same as the percent depletion of one of the anode or cathode of the main cell. A visual display showing the percent depletion of one of the electrodes of the indicator cell can thus be employed to reflect the state of charge of the main cell 30.

Figure 1A:
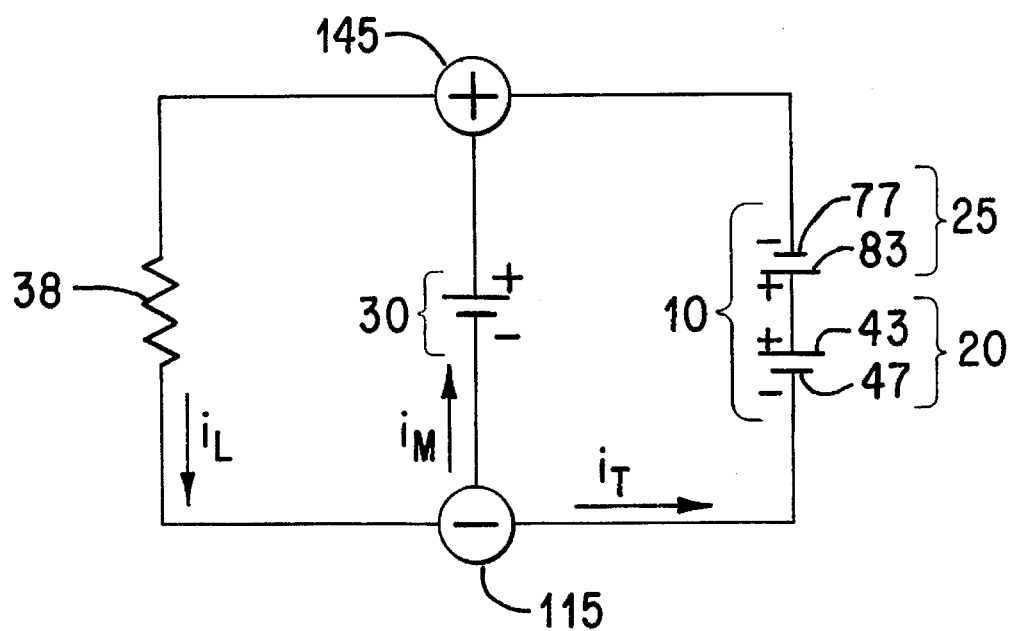
FIG. 1A is a circuit diagram showing the connection of the condition indicator assembly of the invention to the main cell being tested with the voltage of the indicator cell portion higher than the voltage of the main cell.

In the circuit arrangement, depicted in FIG. 1A, the condition indicator 10 comprises an indicator cell 20 and an auxiliary cell 25. In the circuit arrangement depicted in FIG. 1A the open circuit voltage (OCV) of the indicator cell 20 is higher than the open circuit voltage of main cell 30. In this case the auxiliary cell cathode 83 is electrically connected to the indicator cell cathode 43, the auxiliary cell anode 77 is connected to the main cell cathode 145, and the indicator cell anode 47 is connected to the main cell anode 115. In such arrangement the open circuit voltage of the auxiliary cell 25 reduces the open circuit voltage of the open circuit voltage of the indicator cell 20 so that the open circuit voltage of the condition indicator 10 as a whole, i.e., between anode 77 of the auxiliary cell 25 and anode 47 of the condition indicator cell 20 is about the same as the open circuit voltage of the main cell 30. The same effect in this case may also be achieved by connecting anode 47 of indicator cell 20 to anode 77 of auxiliary cell 25, connecting cathode 43 of the indicator cell 20 to cathode 145 of the main cell 30 and connecting cathode 83 of the auxiliary cell 25 to anode 115 of main cell 30.

Figure 2:
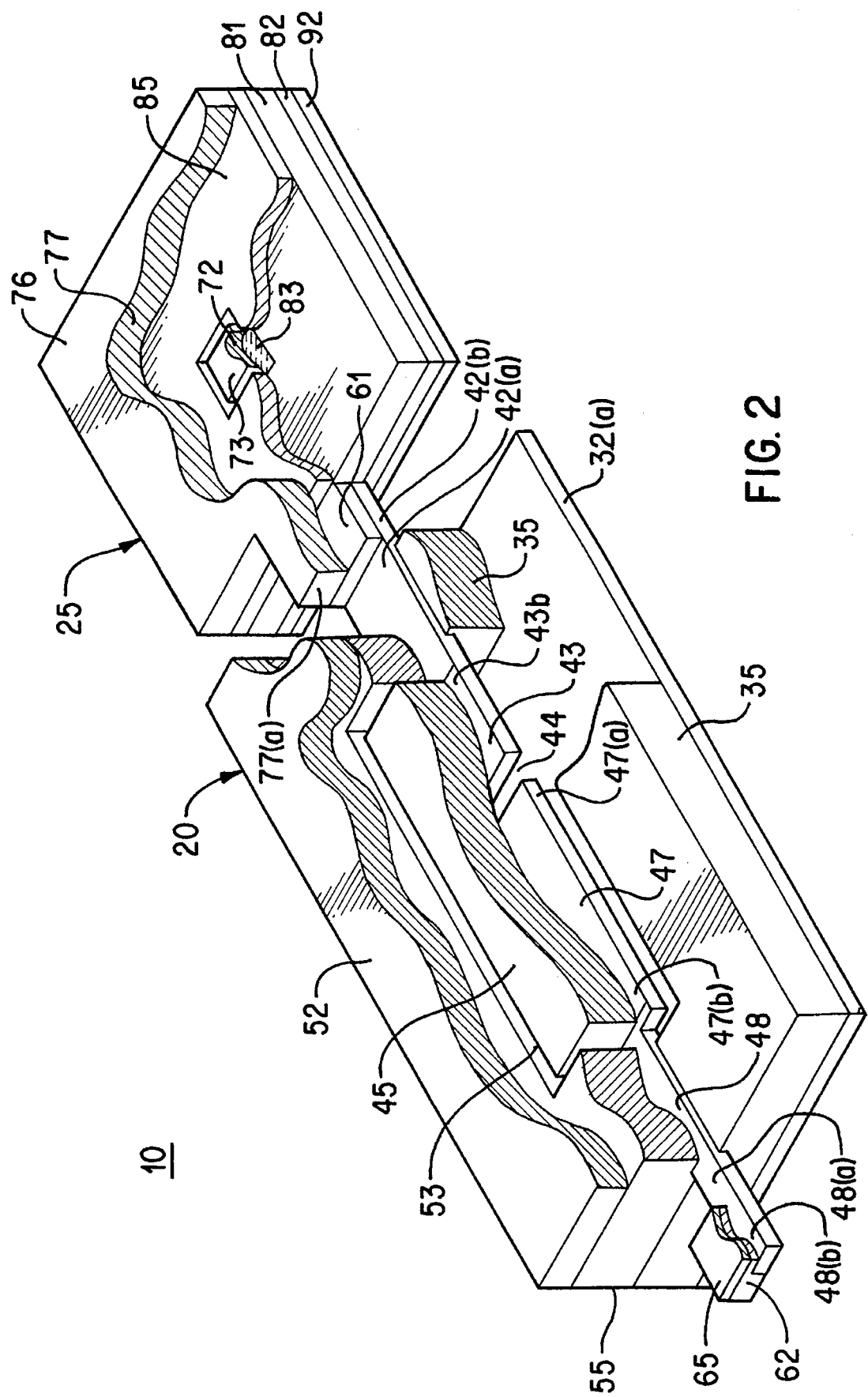
FIG. 2 is a cutaway perspective view of the condition indicator assembly referenced in FIG. 1.

Condition indicator 10 comprising an indicator cell 20 and auxiliary cell 25 is shown in FIG. 2 in an arrangement consistent with the circuit diagram of FIG. 1. Condition indicator 10 may be permanently connected to a main cell 30 (FIG. 2A), such as a conventional alkaline cell, for example, by integrating it into the label for the main cell. Since the open circuit voltage discharge profile across the condition indicator 10 is about the same as the open circuit voltage discharge profile of the main cell 30, the ratio of current flow through the main cell to the current flow through the auxiliary cell stays at nearly constant value. This can be so irrespective of the load on the main cell. Thus, at any time during discharge of the main cell, the percent depletion of one of a controlling anode or cathode of either indicator cell 20 or auxiliary cell 25 will be about the same as the percent depletion of one of a controlling anode or cathode of the main cell 30. (If the amount of anode active material or cathode active material in either the main cell 30 or indicator cell 20 is in excess, the comparison of percent depletion between the two cells should be made using the electrode containing active material not in excess. The electrode not in excess is referred to herein as the controlling electrode.)

Typically, the percent depletion (clearing) of the anode 47 of indicator cell 20 can be employed to reflect the percent depletion of a controlling electrode in the main cell. This can be used to provide a continual visual indication of the condition (state of charge) of the main cell. The percent active material remaining in the indicator cell 20 may be visually discernible at any time during the life of the main cell. For example, if the indicator anode 47 is being depleted, the anode may be made visually discernible and a graphics scale positioned next to that anode may indicate the percent charge remaining in the main cell 30 and/or whether the main cell needs to be replaced.

Condition indicator 10 may be connected in parallel with main cell 30 being tested, for example, as illustrated in the circuit diagram of FIG. 1. In FIG. 1 the main cell 30 is shown schematically with negative terminal 115 and positive terminal 145. In use, when main cell 30 is connected to a load 38 and discharges, current $i_L$ flows through the load 38, current $i_M$ flows through the main cell 30 and current $i_T$ flows through condition indicator 10 such that $i_L = i_M + i_T$. In the circuit configuration of FIG. 1, if the main cell is a conventional AA size alkaline cell having an internal resistance of about 0.1 ohm during normal operation, the combined internal resistance of indicator cell 20 and auxiliary cell 25 is typically at least about $10^4$ times, more typically between about $10^4$ and $10^6$ times the internal resistance of main cell 30. It should be appreciated that the total resistance of the condition indicator 10 may be adjusted by altering the internal resistance of each of the indicator cell 20 and auxiliary cell 25 or by adding resistors in series with these two cells.

In a preferred embodiment condition indicator 10 (tester assembly) as shown in FIG. 2 comprises an indicator cell 20 electrically connected in series to an auxiliary cell 25 in the manner corresponding to the circuit arrangement of FIG. 1. Condition indicator 10 (tester) has a thickness less than 100 mils (2.5 mm), preferably a thickness between about 2 and 100 mils (0.05 and 2.5 mm), more preferably a thickness between about 2 and 15 mils (0.05 and 0.4 mm). Auxiliary cell 25 is a miniature thin power source which at least partially drives indicator cell 20. Main cell 30 may be a primary or secondary battery and typically may be a conventional alkaline cell. Condition indicator 10 may be integrated into the label for the main cell 30, for example, by attaching it to the inside surface of the label. Indicator cell 20 contains an anode 47 and cathode 43 composed of different materials in contact with an electrolyte. The indicator cell 20 and auxiliary cell 25 discharges linearly proportional to the discharge of the main cell 30, irrespective of load 38. For example, indicator cell 20 can be calibrated so that during discharge of main cell 30 the percentage discharge of the either a controlling anode or cathode of the indicator cell 20 will be about the same as the percent discharge of a controlling electrode of main cell 30. For usage of the main cell 30 at extremely high or low current drain, i.e., greatly deviating from normal usage, the percent discharge of the indicator cell 20 will be a function of the percent discharge of the main cell, if not a linear function thereof.

Indicator cell 20 (FIG. 2) is a miniature electrochemical cell containing a cathode material 43 and anode material 47 which are desirably spaced apart from each other, and which may lie in the same plane. Cathode 43 and anode 47 are desirably of different electrochemically active materials in contact with electrolyte resulting in a cell having a finite electromotive force. Cathode 43 and anode 47 are thin coatings deposited onto substrates 42 and 48, respectively. It is desirable that the material used for cathode 43 and cathode substrate 42 not be reactive in the ambient atmosphere or subject to corrosion. In the embodiment shown in FIG. 2 a preferred cathode material 43 may of lambda $MnO_2$ and a preferred anode material may be silver. Anode substrate 48 is preferably conductive and preferably of carbon and cathode substrate 42 is conductive. (It is possible to use a nonconducting material for anode substrate 48, but a conducting substrate is preferred and will be described herein.) A conducting anode substrate 48 is used to prevent electrically isolated islands of metal from appearing on the substrate as anode 47 is electrochemically stripped (cleared) from one end to the other. A further requirement is that anode substrate 48 be of a color that provides high contrast to the color of anode 47, thus giving highly discernible visual indication of the clearing of anode 47. A preferred arrangement of cathode 43 and anode 47 in relationship to each other and the underlying conductive substrate is shown in FIG. 2. A space 44 separates cathode 43 from anode 47 and also separates underlying conductive substrates 42 from 48, as may be seen best in FIG. 2. Also, there may be a film of insulating material 35 under conductive substrates 42 and 48.

Figure 2A:
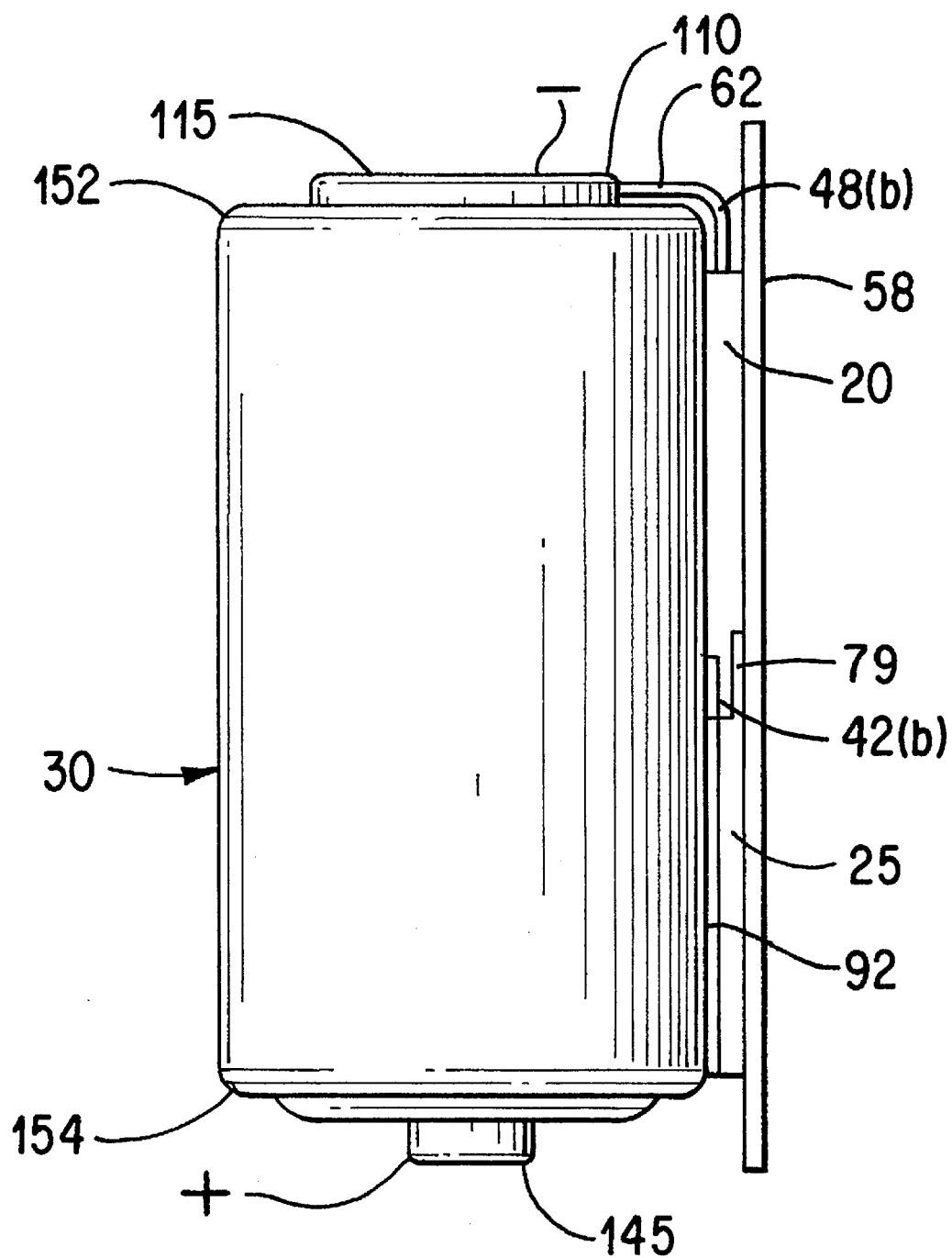
FIG. 2A shows a battery having a permanently connected condition indicator assembly with the condition indicator assembly in partial cross sectional view shown enlarged.

Conductive substrate 42 (FIG. 2) can extend beyond the edge 43(b) of the overlying cathode material to form extended substrate portions 42(a). Similarly conductive substrate 48 can extend beyond the edge 47(b) of the overlying anode material to form extended substrate portion 48(a). An adhesive is applied to the surface of extended portions 42(a) and 48(a), thus forming an adhesive border 55 around the periphery of conductive substrates 42 and 48. Adhesive border 55 defines a window space 53 over cathode 43 and anode 47. A layer of clear electrolyte 45 is applied in window space 53 so that it covers cathode 43 and anode 47. The end 48(b) of extended substrate portion 48(a) protrudes from the anode side of cell 20. Similarly the end 42(b) of extended substrate portion 42(a) protrudes from the cathode side of cell 20. A piece of aluminum foil 65 is attached to anode substrate end 48(b) using conductive adhesive 62 placed therebetween. Foil 65 serves to carry current from substrate 48 to the battery negative terminal 115 (FIG. 2A). Cathode substrate end 42(b) is covered on its top surface with conductive adhesive 61. A transparent barrier film 52 is applied over window 53 with the edges of the film in contact with adhesive border 55. Thus, barrier film 52 is a protective film which covers and tightly seals off electrolyte 45. Barrier film 52 is held in place by adhesive border 55. Indicator cell 20 may be secured to the casing of main cell 30 with a pressure sensitive adhesive 32 applied the underside of the condition indicator under insulating film 35.

Auxiliary cell 25 (FIG. 2) is desirably a thin flat power cell. Auxiliary cell 25 has a thickness less than 100 mils (2.5 mm), preferably a thickness between about 2 and 100 mils (0.05 and 2.5 mm), more preferably a thickness between about 2 and 15 mils (0.05 and 0.4 mm). Auxiliary cell 25 contains a coating of anode active material 77, a coating of cathode active material 83, and electrolyte layer 73 therebetween. The anode active material 77 may be coated or laminated to a conductive substrate 76. Anode active material 77 contacts separator 72 filled with electrolyte 73. Cathode active material 83 which may be coated or laminated to a conductive substrate 81 is also in contact with the electrolyte 73 contained within separator 72. The anode and cathode conductive substrates, 78 and 81, respectively, may typically be carbon coated aluminum or metal foil. A conductive adhesive 92 may be applied to the underside of auxiliary cell 25 in contact with the exposed surface of conducting substrate 81. The auxiliary cell 25 is electrically connected to the indicator cell 20 (FIG. 2) is electrically connected to by applying the anode tab 77(a) of the auxiliary cell 25 so that it contacts conductive adhesive 61 on cathode substrate tab 42(b) of the indicator cell 20. This electrically connects auxiliary anode active material 77 with cathode 43 of indicator cell 20 consistent with the circuit diagram of FIG. 1. Connections to main cell 30, typically a conventional alkaline cell, is illustrated with reference to FIGS. 2A. Auxiliary cathode active material 83 becomes electrically connected to the positive terminal 145 of main cell 30 through conductive adhesive 92 (FIG. 2) which connects auxiliary cathode 83 to the main cell housing as shown in FIG. 2A. Foil tab 65 is pressed into permanent contact with negative end cap 110 of the main cell (FIG. 2A) so that conductive adhesive 62 contacts end cap 110. Such connection places anode 47 of indicator cell 20 in electrical contact with the negative terminal 115 of the main cell 30.

Condition indicator 10 may be integrated onto the inside surface of a film label 58 for the main cell as illustrated in FIG. 2A. Label 58 may desirably be a heat shrinkable film such as polyvinylchloride or polypropylene. Condition Indicator 10 may be formed on one side of the label by sequential printing or lamination of each of the coatings that comprise the indicator cell 20 and auxiliary cell 25. A layer of heat resistant pressure sensitive adhesive, may be applied to the inside surface of the label and the label with integrated condition indicator may be applied to main cell 30 by wrapping it around the cell housing. The ends of the label may then be heat shrunk over the top and bottom shoulders 152 and 154, respectively, in conventional manner by subjecting the edges of the label to sufficient heat to cause shrinkage.

In operation, when the main cell 30 discharges, indicator anode active material 47 discharges (clears). Anode active material 47 disappears gradually from the portion of anode active layer closest to cathode layer 43, namely, from end 47(a) (FIG. 2). This provides a visually discernible fuel gauge effect. The amount of indicator anode remaining in cell 20 at any time during the life of main cell 30 is readily visible through transparent electrolyte 45. This enables easy determination of the degree of discharge of the main cell by visual inspection through window 53 of the amount of anode 47 remaining in indicator cell 20. A calibrated graphics scale may be provided adjacent indicator anode 47 to make it easier to determine when anode 47 has been sufficiently depleted indicating that main cell 30 must be replaced.

The following materials can be used to construct condition indicator 10: The indicator cell anode 47 may be composed of a silver coating (thickness between 500 and 1000 angstrom) deposited on top of anode substrate 48 by sputtering or by electron beam evaporation. Indicator cell anode substrate 48 and cathode substrate 42 may be composed of a carbon filled polyethylene material (Velstat from 3M) Materials, Inc. (CMI). Alternatively, anode substrate 48 may be composed of an insulating plastic film such as ACLAR film (polychlorotrifluoroethylene) from Allied Signal Co. or KALODEX film (polyethylene naphthalate) from ICI Americas coated with an electronically conducting film such as indium tin oxide (ITO) or conductive carbon coating. Alternatively, anode substrate 48 may be composed of an insulating material. Anode substrate 48 has a thickness desirably between about 0.5 and 1 mil.

The indicator cell cathode 43 is composed of a cathode mixture, for example, containing cathode active material such as $V_2O_5$ or lambda $MnO_2$. The cathode mixture containing the $V_2O_5$ or lambda $MnO_2$ material can be prepared by mixing such material with conductive particulates for example, carbon, graphite or metallic powder. The cathode mixture may be further mixed with binder and solvent such as polyvinylidene fluoride and 1-methyl-2-pyrrolidinone to form a coatable ink. The ink may then be coated onto the cathode substrate 42 as a wet film of 0.2–2 mil thick and then dried to form the cathode.

The indicator cell electrolyte 45 (FIG. 2) may be prepared by first forming an electrolyte solution composed of a mixture of silver trifluoromethanesulfonylimide (AgTFSI), lithium trifluoromethanesulfonylimide (LiTFSI) dissolved in 3-methylsulfolane solvent and then gelling the solution with poly(vinylidene fluoride). Electrolyte 45 may be prepared by mixing 8 parts by weight of the electrolyte solution with 3 parts by weight of poly(vinylidene fluoride). The mixture is extruded at a temperature of about 140° C. to the desired thickness, preferably between about 1 and 4 mils (0.025 mm and 0.10 mm) and applied over the indicator cell anode 47 and cathode 43.

The indicator adhesive frame 55 (FIG. 2) may be selected from a wide range of pressure sensitive adhesives. A desirable adhesive is a conventional butyl rubber based adhesive such as polyisobutylene/isoprene copolymer adhesive available as Butyl 065 rubber adhesive from EXXON Co. Adhesive frame 55 desirably has a thickness between about 1 and 2.5 mil (0.025 mm and 0.0625 mm). Indicator transparent barrier 52 may be desirably composed of ACLAR (polychlorotrifluoroethylene) film (Allied Signal Co.) of thickness between about 0.6 and 1 mil (0.015 and 0.025 mm) or Kalodex film (Polyethylene naphthalate). Conductive adhesive 62 may desirably be a carbon filled conductive adhesive such as that available under the trade designation ARCLAD conductive transfer adhesive from Adhesives Research Co. Adhesive coating 62 may desirably be about 0.5 mil (0.012 mm) thick. Foil backing 65 may desirably be of aluminum foil between about 0.25 and 0.5 mil (0.006 and 0.012 mm) thick.

The materials used in the auxiliary cell 25 depends on the open circuit voltage of the indicator cell. Materials for the auxiliary cell 25 are selected so that the total open circuit voltage across the condition indicator assembly 10 as a whole is about the same as that of the main cell being discharged. Either aqueous or organic electrolytes may be used in auxiliary cell 25. If an aqueous electrolyte is used, a typical auxiliary cell cathode conductive substrate 81 may be composed of conductive carbon-filled poly(vinylacetate)/poly(vinyl chloride) polymer film (Rexham Graphics conductive plastic film no. 2664-01). As above described conductive layer 81 is laminated to a layer 82 of aluminum foil. The conductive polymer film may desirably be about 1mil (0.025 mm) thick and the aluminum foil between about 0.25 and 0.5 mil (0.006 and 0.012 mm) thick. The auxiliary cell cathode 83 is desirably composed of a printed coating containing X% electrolytic manganese dioxide (EMD), (90–X)% graphite, and 10% polyvinylchloride binder. Cathode active layer 83 may be prepared by dispersing 3 parts by weight of the a mixture of EMD and graphite in 7 parts by weight of aqueous 0.75% Carbopol 940 (B.F. Goodrich Co.) crosslinked acrylic acid copolymer and adjusting the mixture to a pH of 10 with KOH and then adding HALOFLEX 320 (ICI Americas - U.S. Resins Division) PVC latex in sufficient amount that it comprises 10 wt.% of the final dried cathode material. The mixture is then coated as a wet film (0.2 to 0.5mil thick) onto carbon-filled polymer layer 81 and then air dried to form dried cathode active layer 83.

Auxiliary cell separator 72 may be a nitrocellulose or cellophane porous membrane of thickness about 1 mil (0.025 mm) containing about 2–8 microliters of an electrolyte solution 73 composed of about of 24 to 32% by weight aqueous ZnCl adjusted to a pH of 4 by adding ZnO. A seal 85 is provided between the outer edges of anode 77 and cathode 83 to hold the auxiliary cell together and prevent contaminants from entering the cell. Seal 85 may suitably be formed of a heat sealable film of polyvinylacetate/polyvinylchloride. Alternatively, it may be composed of a butyl rubber pressure sensitive adhesive such as Butyl 065 rubber from Exxon Co. Seal 85 is advantageously between about 1 and 2 mil (0.025 mm and 0.05 mm) thick.

The auxiliary cell anode material 77 may be coated onto a substrate 76 composed of conductive carbon-filled poly(vinyl acetate)/poly(vinyl chloride) polymer film (Rexham Graphics conductive plastic film no. 2664-01). Substrate 76 may be laminated to a layer of aluminum foil (not shown) on the surface of substrate 76 opposite anode material 77. The conductive polymer film may desirably be about 1 mil (0.025 mm) thick and the aluminum foil between about 0.25 and 0.5 mil (0.006 and 0.012 mm) thick. The auxiliary cell anode layer 77 may be a coating composed of 90% anode powder, (e.g., zinc powder or other metallic powder depending on the voltage needed) and 10% styrene-butadiene copolymer (SBR) binder. Anode layer 77 may be prepared by first dispersing 6.5 parts by weight Zn powder (5 to 7 micrometer particle size) in 3.5 parts by weight aqueous 1.25% Carbopol 940 crosslinked acrylic acid copolymer gel (adjusted to a pH of 12 with KOH). Then a styrene-butadiene rubber latex (ROVENE 5550 SBR latex from Rohm & Haas Co.) is added in amount sufficient to yield 1 part by weight styrene-butadiene rubber per 9 parts zinc in the final dry film. The mixture is then coated as a wet film (0.5 to 1.5 mil thick) onto carbon-filled polymer layer 76 and then air dried.

Auxiliary cell contact adhesive 61 and 92 may be selected from a variety of conductive adhesives. A suitable adhesive 61 or 92 may be a conductive carbon-filled transfer adhesive available as ARCLAD adhesive from Adhesives Research Co. Such adhesive may be coated to a thickness of about 0.5 mil (0.012 mm) over aluminum foil layer 82 forming adhesive layer 92. The same adhesive composition may be coated to a thickness of about 0.5 mil (0.012 mm) forming adhesive layer 61 over indicator cathode substrate end 42(*b*).

Indicator backing adhesive 32 may be selected from a wide variety of pressure sensitive adhesives. Desirably adhesive 32 is composed of a butyl rubber pressure sensitive adhesive such as Butyl 065 rubber from Exxon Co.

The following are working examples of the tester described with reference to FIG. 2:

EXAMPLE 1

Working condition indicator assemblies 10 of the type described in the preferred embodiment (FIG. 2) are constructed and used to indicate the state of charge of conventional $Zn/MnO_2$ (1.5 volt) AA alkaline cells discharged through various loads.

Indicator cells 20 as described with reference to FIG. 2 are prepared with the following components: The indicator cell anode 47 is prepared by sputter-depositing 600 angstrom of silver onto conducting carbon filled substrates 48 (Velstat carbon filled polyethylene from 3M Company). The anode area is about 0.86 in. (2.2 cm.) by 0.2 in. (0.51 cm). The indicator cell cathode 43 is formed by first preparing a cathode mixture of 70:30 (by weight) of $V_2O_5$ and graphite. Then, 3 gm of this $V_2O_5$ and graphite mixture is mixed with 0.45 g of polyvinylidene fluoride (PVDF) and 4.5 g of 1-methyl-2-pyrolidinone to form an ink. The ink is coated on substrate 42 (VELSTAT carbon filled polyethylene) and dried at 150° C. for 1 hr. in air to form a 1 mil thick cathode coating. The cathode area is about 0.2 in (0.51 cm) by 0.2 in. (0.51 cm). The cathode is separated from anode by a gap of about 0.05 in. (0.13 cm) within a 2.5 mil (0.06 mm) thick butyl rubber pressure sensitive adhesive window having an interior space about 0.7 in. long by 0.30 in. wide. Anode and cathode are contacted by 2 mil thick transparent electrolyte 45 about 0.61 in. long by about 0.2 in. wide consisting of 0.5 M LiTFSI (lithium trifluoromethanesulfonylimide) and 0.003M AgTFSI (silver trifluoromethanesulfonylimide) in solvent and prepared as previously described for the preferred embodiment. A 1 mil thick KOLODEX poly(ethylene naphthalate) transparent barrier film 52 about 1 in. long by 0.60 in. wide is used to seal the indicator. Finished indicators are between about 6 and 7 mil (0.15 and 0.18 mm) thick.

Auxiliary cells 25 of the type described with reference to FIG. 2 are prepared with the following components. The auxiliary cell cathode 83 is prepared by coating a manganese dioxide layer containing electrolytic manganese dioxide (EMD) on a conductive substrate 81 composed of Rexham Graphics no. 2664-01 conducting carbon-filled plastic film as previously described. The manganese dioxide coating is applied as a 0.5 mil thick wet film having dry composition which is 68% EMD and 17% graphite.

The auxiliary cell anode 77 is prepared by applying a zinc coating on Rexham Graphics no. 2664-01 conducting carbon-filled plastic substrate as described in the preceding description. The dry zinc anode has thickness of about 1 mil and about 0.070 in$^2$ (0.45 cm$^2$) area to give capacity several fold in excess of that of the cathode. The separator 72 is prepared employing 1 mil thick cellophane film containing a about 6×10$^{-6}$ liter of pH 4 (28% ZnCl$_2$) electrolyte. Seal 85 is a 2 mil thick butyl rubber pressure sensitive adhesive (Butyl rubber 065 adhesive from Exxon ) used to seal the auxiliary cell. Finished auxiliary cells are about 8 mil thick and had alternating current resistance measured at 1 kHz of about 2 k-ohm.

Indicator and auxiliary cells are connected to each other in series to form a condition indicator assembly 10 as shown in FIG. 2. The completed condition indicator 10 in this example has a thickness between about 6 and 8 mils (0.15 and 0.2 mm). The condition indicator 10 is connected in parallel as shown in FIG. 1 and 2A) to the terminals of a fresh Zn/MnO$_2$ (1.5 volt) AA alkaline cells using ARCLAD 0.5 mil thick conductive adhesive (61 and 92) as previously described. The indicator cell 20 has a positive electromotive force (e.m.f.). The open circuit voltage across the condition indicator assembly 10 as a whole is about the same as that of the main cell being discharged.

The AA cells are discharged from 1.5 to 0.8 volts through load resistors of either 1 ohm, 4 ohm, 36 ohm, or 75 ohm, either continuously or intermittently and the current through the indicator cell 20 is about (0.5–2)×10$^{-6}$ amps. In all cases the indicator anode clears in a gauge-like fashion to visually reveal the underlying black conducting anode substrate 48, with the clearing beginning from the end 47(a) closest to the cathode and proceeding towards the opposite end of the cathode. The amount of clearing correlates proportionally with the extent of discharge of the AA cell. Thus the tester serves as an effective state of charge indicator for the main cell.

The specific condition indicator assembly described in this example can be employed advantageously to test the condition of a conventional Zn/MnO$_2$ alkaline cell which may operate typically with load resistance between about 1 and 1000 ohms. Application of the invention, however, is not intended to be limited to alkaline cells but rather may be used effectively to test the condition of any dry cell.

EXAMPLE 2

Indicator cells 20 are prepared in the same manner as described in Example 1, except the V$_2$O$_5$ cathode mixture was replaced with a different cathode mixture containing lambda MnO$_2$. A cathode ink is first prepared by mixing 3 g of a mixture of LiMn$_2$O$_4$ and graphite (70:30 by weight), 0.45 g of polyvinylidene fluoride (PVDF) and 4.5 g of n-methylpyrrolidinone (NMP). The cathode ink is coated onto substrate 42 (VELSTAT material) and dried at 150° C. in air for 1 hr. The LiMn$_2$O$_4$ contained in the dried ink is converted into lambda MnO$_2$ by leaching the dried ink on the substrate in 0.03M H$_2$SO$_4$ for 30 minutes. After the acid leaching, the cathodes are rinsed and dried in air for 1 hr. The indicator cell 20 is assembled in the same manner described in Example 1 but with the above described cathode being employed. The indicator cell 20 of this example has an open circuit voltage of about 0.5 volts.

The auxiliary cells are prepared in the same manner as described in Example 1, except a Pb anode is used. The Pb anode can be prepared in the same manner as the Zn anode, except Pb powder is employed instead of Zn. The electrolyte used is 28% ZnCl$_2$ pH 4 saturated with PbCl$_2$. The auxiliary cell thus prepared has a open circuit voltage (OCV) of about 1.05 volts.

The indicator cell and the auxiliary cell are connected in series with each other as in Example 1 to form the condition indicator assembly 10 connected to a fresh Zn/MnO$_2$ (1.5V) AA alkaline cell. The open circuit voltage across the condition indicator assembly 10 is about the same as that of the AA cell. During the discharge of AA cell, the condition indicator behaves similar to that of Example 1. In all cases the indicator anode clears in a gauge-like fashion to visually reveal the underlying black conducting substrate 48, with the clearing beginning from the end 47(a) closest to the cathode and proceeding towards the opposite end of the anode. The amount of clearing correlates proportionally with the extent of discharge of the AA cell. Thus, the assembly 10 serves as an effective state of charge indicator for the main cell.

Although the present invention has been described with reference to specific embodiments and specific materials of construction, it will be appreciated that other embodiments and materials are possible without departing from the concept of the invention. Therefore, the invention is not intended to be limited to specific embodiments described herein, but rather the scope of the invention is defined by the claims and equivalents thereof.

What is claimed is:

1. A condition indicator assembly for determining the state of charge of an electrochemical power source to be tested, said condition indicator assembly comprising an indicator cell and a label attached to the electrochemical power source, said indicator cell being integrated into said label, said indicator cell comprising an anode, a cathode and an electrolyte, said electrolyte electrically contacting at least a portion of both said anode and cathode, wherein said indicator cell has an electromotive force (e.m.f.) of its own and wherein at least a portion of one of said electrodes of the indicator cell is visible, said condition indicator assembly further comprising an auxiliary cell being a power generating electrochemical cell comprising an anode, a cathode, and an electrolyte contacting at least a portion of said auxiliary cell anode and cathode, wherein one of the anode and cathode of the auxiliary cell is electrically connected to one of the anode and cathode of the indicator cell and wherein the remaining electrode of the auxiliary cell and the remaining electrode of the indicator cell are adapted to be electrically connected in parallel to the electrochemical power source.

2. The condition indicator assembly of claim 1 wherein said condition indicator assembly has a thickness of between about 2 and 100 mils (0.05 and 2.5 mm).

3. The condition indicator assembly of claim 1 wherein the anode and cathode of the indicator cell comprises different electrochemically active materials.

4. The condition indicator assembly of claim 1 wherein the open circuit voltage of the condition indicator assembly is similar to the open circuit voltage of said electrochemical power source.

5. The condition indicator assembly of claim 1 wherein the open circuit voltage of said condition indicator assembly is within about 300 millivolts of the open circuit voltage of said electrochemical power source.

6. The combination of a battery and a battery condition indicator assembly for determining the state of charge of said battery; wherein said battery comprises a casing, a negative terminal, and a positive terminal and said condition indicator assembly is integrated into a label attached to said battery; wherein said indicator assembly comprises an indicator cell comprising an anode, a cathode, and an electrolyte, said electrolyte electrically contacting at least a portion of both said anode and cathode of the indicator cell; wherein said indicator cell has an electromotive force (e.m.f.) of its own and at least a portion of one of said anode and cathode of the indicator cell is visible; wherein said condition indicator assembly further comprises an auxiliary cell being a power generating electrochemical cell comprising an anode, a cathode, and an electrolyte contacting at least a portion of said auxiliary cell anode and cathode; wherein one of the anode and cathode of the auxiliary cell is electrically connected to one of the anode and cathode of the indicator cell; wherein the remaining electrode of the auxiliary cell and the remaining electrode of the indicator cell are electrically connected in parallel to the battery terminals; and wherein during discharge of said battery reaction begins in said visible electrode of said indicator cell and continues to remote regions thereof.

7. The combination of claim 6 wherein the cell condition indicator assembly has a thickness of between about 2 and 100 mils (0.05 and 2.5 mm).

8. The combination of claim 6 wherein the anode and cathode of the indicator cell comprises different electrochemically active material.

9. The combination of claim 6 wherein the anode and cathode of the indicator cell are laterally spaced apart so that no portion of the indicator cell anode overlaps any portion of the electrolytic cell cathode.

10. The combination of claim 6 wherein the anode of said indicator cell comprises silver.

11. The combination of claim 10 wherein the cathode of said indicator cell comprises $V_2O_5$.

12. The combination of claim 10 wherein the cathode of said indicator cell comprises lambda $MnO_2$.

13. The combination of claim 10 wherein the indicator cell electrolyte comprises lithium trifluoromethanesulfonylimide and silver trifluoromethanesulfonylimide.

14. The combination of claim 6 wherein the anode of the auxiliary cell comprises zinc and the cathode of auxiliary cell comprises manganese dioxide.

15. The combination of claim 6 wherein the anode of the auxiliary cell comprises lead and the cathode of auxiliary cell comprises manganese dioxide.

* * * * *